(12) United States Patent
Khlat

(10) Patent No.: US 12,640,759 B2
(45) Date of Patent: May 26, 2026

(54) LOW-COMPLEXITY AMPLITUDE ERROR CORRECTION IN A WIRELESS COMMUNICATION CIRCUIT

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 236 days.

(21) Appl. No.: 18/394,320

(22) Filed: Dec. 22, 2023

(65) Prior Publication Data

US 2024/0250704 A1 Jul. 25, 2024

Related U.S. Application Data

(60) Provisional application No. 63/480,785, filed on Jan. 20, 2023.

(51) Int. Cl.
| | |
|---|---|
| *H04B 1/04* | (2006.01) |
| *H03F 3/24* | (2006.01) |
| *H04B 1/76* | (2006.01) |
| *H04K 1/02* | (2006.01) |

(52) U.S. Cl.
CPC ................ *H04B 1/04* (2013.01); *H04B 1/76* (2013.01); *H04B 2001/0425* (2013.01)

(58) Field of Classification Search
None
See application file for complete search history.

(56) References Cited

U.S. PATENT DOCUMENTS

| | | |
|---|---|---|
| 4,797,898 A | 1/1989 | Martinez |
| 5,793,821 A | 8/1998 | Norrell et al. |

| | | |
|---|---|---|
| 6,166,601 A | 12/2000 | Shalom et al. |
| 6,275,685 B1 | 8/2001 | Wessel et al. |
| 6,630,862 B1 | 10/2003 | Perthold et al. |

(Continued)

FOREIGN PATENT DOCUMENTS

| | | |
|---|---|---|
| BR | 112015001348 A2 | 7/2017 |
| CN | 1151229 A | 6/1997 |

(Continued)

OTHER PUBLICATIONS

Notice of Allowance for U.S. Appl. No. 17/700,685, mailed Apr. 5, 2024, 7 pages.

(Continued)

*Primary Examiner* — Pablo N Tran
(74) *Attorney, Agent, or Firm* — Withrow & Terranova, P.L.L.C.

(57) ABSTRACT

Low-complexity amplitude and phase (AM-PM) error correction in a transceiver circuit is provided. In embodiments disclosed herein, a transceiver circuit is configured to equalize an input vector to thereby correct an AM-AM error across a modulation bandwidth of the wireless communication circuit. Unlike conventional methods where complicated memory digital predistortion (mDPD) coefficients must be defined and calibrated for each modulation frequency within the modulation bandwidth, the transceiver circuit is configured herein to eliminate modulation frequency dependency of the AM-AM error. As a result, it is possible to correct the AM-AM error across the modulation bandwidth with reduced complexity to thereby improve efficiency and linearity of the wireless communication circuit.

20 Claims, 6 Drawing Sheets

(56) References Cited

U.S. PATENT DOCUMENTS

| | | | |
|---|---|---|---|
| 6,760,451 | B1 | 7/2004 | Craven et al. |
| 6,806,767 | B2 | 10/2004 | Dow |
| 6,947,711 | B1 | 9/2005 | Leyonhjelm |
| 7,076,225 | B2 | 7/2006 | Li et al. |
| 7,170,342 | B2 | 1/2007 | Suzuki et al. |
| 7,430,248 | B2 | 9/2008 | McCallister |
| 7,522,658 | B2 | 4/2009 | Jensen |
| 7,583,754 | B2 | 9/2009 | Liu |
| 7,590,190 | B2 * | 9/2009 | Luke .................. H04L 27/3809 |
| | | | 375/232 |
| 7,663,436 | B2 | 2/2010 | Takano et al. |
| 7,683,713 | B2 | 3/2010 | Hongo |
| 7,738,593 | B2 | 6/2010 | Howard |
| 7,755,429 | B2 | 7/2010 | Nguyen et al. |
| 7,831,221 | B2 | 11/2010 | Leffel et al. |
| 7,859,338 | B2 | 12/2010 | Bajdechi et al. |
| 7,889,820 | B2 | 2/2011 | Murthy et al. |
| 7,978,009 | B2 | 7/2011 | Mu |
| 8,493,141 | B2 | 7/2013 | Khlat et al. |
| 8,605,819 | B2 | 12/2013 | Lozhkin |
| 8,639,199 | B1 * | 1/2014 | Premakanthan ..... H04B 1/0475 |
| | | | 455/127.1 |
| 8,649,745 | B2 | 2/2014 | Bai et al. |
| 8,718,579 | B2 | 5/2014 | Drogi |
| 8,749,309 | B2 | 6/2014 | Ho et al. |
| 8,831,544 | B2 | 9/2014 | Walker et al. |
| 8,884,692 | B2 | 11/2014 | Lee |
| 9,001,947 | B2 | 4/2015 | Wyville |
| 9,036,734 | B1 | 5/2015 | Mauer et al. |
| 9,065,504 | B2 | 6/2015 | Kwon et al. |
| 9,112,413 | B2 | 8/2015 | Barth et al. |
| 9,356,760 | B2 | 5/2016 | Larsson et al. |
| 9,438,186 | B2 | 9/2016 | Srinidhi Embar et al. |
| 9,438,196 | B2 | 9/2016 | Smith et al. |
| 9,461,596 | B1 | 10/2016 | Ozard |
| 9,560,595 | B2 | 1/2017 | Dakshinamurthy et al. |
| 9,692,366 | B2 | 6/2017 | Pilgram |
| 9,705,477 | B2 | 7/2017 | Velazquez |
| 9,853,603 | B2 | 12/2017 | Wang |
| 9,945,901 | B1 * | 4/2018 | Otte .................... H03M 1/1042 |
| 9,973,370 | B1 | 5/2018 | Langer et al. |
| 10,128,798 | B2 | 11/2018 | Duncan et al. |
| 10,177,719 | B2 | 1/2019 | Gazneli et al. |
| 10,181,478 | B2 | 1/2019 | Scott et al. |
| 10,305,435 | B1 | 5/2019 | Murugesu et al. |
| 10,326,408 | B2 | 6/2019 | Khlat et al. |
| 10,361,744 | B1 | 7/2019 | Khlat |
| 10,432,145 | B2 | 10/2019 | Khlat |
| 10,476,437 | B2 | 11/2019 | Nag et al. |
| 10,778,345 | B2 | 9/2020 | El-Hassan et al. |
| 10,804,866 | B2 | 10/2020 | Lehtola |
| 11,005,368 | B2 | 5/2021 | Bansal et al. |
| 11,088,660 | B2 | 8/2021 | Lin et al. |
| 11,133,854 | B1 | 9/2021 | Pratt et al. |
| 11,165,393 | B2 | 11/2021 | Pehlke |
| 11,387,789 | B2 | 7/2022 | Khlat et al. |
| 11,424,719 | B2 | 8/2022 | Khlat |
| 11,483,186 | B2 | 10/2022 | Casper et al. |
| 11,569,783 | B2 | 1/2023 | Nomiyama et al. |
| 11,595,005 | B2 | 2/2023 | Balteanu et al. |
| 11,637,531 | B1 | 4/2023 | Perreault et al. |
| 12,456,957 | B2 * | 10/2025 | Khlat .................... H03G 5/165 |
| 2001/0022532 | A1 | 9/2001 | Dolman |
| 2001/0054974 | A1 | 12/2001 | Wright |
| 2002/0190811 | A1 | 12/2002 | Sperber |
| 2003/0042979 | A1 | 3/2003 | Gurvich et al. |
| 2004/0239446 | A1 | 12/2004 | Gurvich et al. |
| 2004/0259509 | A1 | 12/2004 | Duello et al. |
| 2005/0100105 | A1 | 5/2005 | Jensen |
| 2005/0190857 | A1 * | 9/2005 | Braithwaite .......... H03F 1/3247 |
| | | | 375/296 |
| 2005/0195030 | A1 | 9/2005 | Okazaki et al. |
| 2005/0254659 | A1 | 11/2005 | Heinsen |
| 2005/0258898 | A1 | 11/2005 | Hongo |
| 2006/0068710 | A1 | 3/2006 | Jensen |

| | | | |
|---|---|---|---|
| 2006/0209981 | A1 | 9/2006 | Kluesing et al. |
| 2006/0217083 | A1 | 9/2006 | Braithwaite |
| 2007/0032208 | A1 | 2/2007 | Choi et al. |
| 2007/0164818 | A1 | 7/2007 | Horiguchi et al. |
| 2007/0190952 | A1 | 8/2007 | Waheed et al. |
| 2008/0009258 | A1 | 1/2008 | Safarian et al. |
| 2008/0074209 | A1 | 3/2008 | Ceylan et al. |
| 2008/0161073 | A1 | 7/2008 | Park et al. |
| 2008/0246550 | A1 | 10/2008 | Biedka et al. |
| 2009/0004981 | A1 | 1/2009 | Eliezer et al. |
| 2009/0061787 | A1 | 3/2009 | Koller et al. |
| 2009/0074106 | A1 | 3/2009 | See et al. |
| 2009/0125264 | A1 | 5/2009 | Betts et al. |
| 2009/0141828 | A1 | 6/2009 | Huang et al. |
| 2009/0141830 | A1 | 6/2009 | Ye |
| 2009/0232260 | A1 | 9/2009 | Hayashi et al. |
| 2009/0302945 | A1 | 12/2009 | Catoiu et al. |
| 2010/0135439 | A1 | 6/2010 | Lackey |
| 2010/0298030 | A1 | 11/2010 | Howard |
| 2011/0095826 | A1 | 4/2011 | Hadjichristos et al. |
| 2011/0182347 | A1 | 7/2011 | Cheung |
| 2011/0227767 | A1 | 9/2011 | O'Brien |
| 2012/0068748 | A1 | 3/2012 | Stojanovic et al. |
| 2012/0139635 | A1 | 6/2012 | Ho et al. |
| 2012/0189081 | A1 | 7/2012 | Omoto et al. |
| 2012/0244824 | A1 | 9/2012 | Entezari et al. |
| 2012/0256688 | A1 | 10/2012 | Onishi |
| 2013/0141062 | A1 | 6/2013 | Khlat |
| 2013/0214858 | A1 | 8/2013 | Tournatory et al. |
| 2013/0222057 | A1 | 8/2013 | Henshaw |
| 2013/0243129 | A1 | 9/2013 | Okuni et al. |
| 2014/0028368 | A1 | 1/2014 | Khlat |
| 2014/0029683 | A1 | 1/2014 | Morris et al. |
| 2014/0055199 | A1 | 2/2014 | Takano et al. |
| 2014/0062590 | A1 | 3/2014 | Khlat et al. |
| 2014/0062599 | A1 | 3/2014 | Xu et al. |
| 2014/0065989 | A1 | 3/2014 | McLaurin |
| 2014/0072307 | A1 | 3/2014 | Zamani et al. |
| 2014/0084996 | A1 | 3/2014 | Schwent et al. |
| 2014/0105264 | A1 | 4/2014 | McLaurin et al. |
| 2014/0141730 | A1 * | 5/2014 | Damavandi ........... H04W 52/52 |
| | | | 455/73 |
| 2014/0184337 | A1 | 7/2014 | Nobbe et al. |
| 2014/0213196 | A1 | 7/2014 | Langer et al. |
| 2014/0232470 | A1 | 8/2014 | Wilson |
| 2014/0266432 | A1 | 9/2014 | Scott et al. |
| 2014/0315504 | A1 | 10/2014 | Sakai et al. |
| 2014/0361837 | A1 | 12/2014 | Strange et al. |
| 2015/0028946 | A1 | 1/2015 | Al-Qaq et al. |
| 2015/0126142 | A1 | 5/2015 | Meredith |
| 2015/0333781 | A1 | 11/2015 | Alon et al. |
| 2016/0173030 | A1 | 6/2016 | Langer et al. |
| 2016/0174293 | A1 | 6/2016 | Mow et al. |
| 2016/0182099 | A1 | 6/2016 | Boddupally et al. |
| 2016/0182100 | A1 | 6/2016 | Menkhoff et al. |
| 2016/0269210 | A1 | 9/2016 | Kim et al. |
| 2016/0301432 | A1 | 10/2016 | Shizawa et al. |
| 2016/0322992 | A1 | 11/2016 | Okawa et al. |
| 2017/0005676 | A1 | 1/2017 | Yan et al. |
| 2017/0104502 | A1 | 4/2017 | Pratt |
| 2017/0149457 | A1 | 5/2017 | Mayer et al. |
| 2017/0170838 | A1 | 6/2017 | Pagnanelli |
| 2017/0230924 | A1 | 8/2017 | Wolberg et al. |
| 2017/0338842 | A1 | 11/2017 | Pratt |
| 2017/0353197 | A1 | 12/2017 | Ruffieux et al. |
| 2018/0034418 | A1 | 2/2018 | Blednov |
| 2018/0175813 | A1 | 6/2018 | Scott et al. |
| 2018/0226923 | A1 | 8/2018 | Nagamori |
| 2018/0248570 | A1 | 8/2018 | Camuffo |
| 2019/0041890 | A1 | 2/2019 | Chen et al. |
| 2019/0058530 | A1 | 2/2019 | Rainish et al. |
| 2019/0068234 | A1 | 2/2019 | Khlat et al. |
| 2019/0097671 | A1 | 3/2019 | Dimpflmaier et al. |
| 2019/0238152 | A1 | 8/2019 | Pagnanelli |
| 2019/0245496 | A1 | 8/2019 | Khlat et al. |
| 2019/0296929 | A1 | 9/2019 | Milicevic et al. |
| 2019/0319583 | A1 | 10/2019 | El-Hassan et al. |
| 2019/0356285 | A1 | 11/2019 | Khlat et al. |
| 2020/0106392 | A1 | 4/2020 | Khlat et al. |

(56) References Cited

U.S. PATENT DOCUMENTS

| | | |
|---|---|---|
| 2020/0119699 A1 | 4/2020 | Nishihara et al. |
| 2020/0136561 A1 | 4/2020 | Khlat et al. |
| 2020/0136563 A1 | 4/2020 | Khlat |
| 2020/0136568 A1 | 4/2020 | Hosoda et al. |
| 2020/0162030 A1 | 5/2020 | Drogi et al. |
| 2020/0204422 A1 | 6/2020 | Khlat |
| 2020/0259685 A1 | 8/2020 | Khlat |
| 2020/0295713 A1 | 9/2020 | Khlat |
| 2020/0336111 A1 | 10/2020 | Khlat |
| 2021/0058970 A1 | 2/2021 | Kwak et al. |
| 2021/0067097 A1 | 3/2021 | Wang et al. |
| 2021/0099136 A1 | 4/2021 | Drogi et al. |
| 2021/0143859 A1 | 5/2021 | Hageraats et al. |
| 2021/0194517 A1 | 6/2021 | Mirea et al. |
| 2021/0194740 A1 | 6/2021 | Aldana et al. |
| 2021/0281228 A1 | 9/2021 | Khlat |
| 2021/0399690 A1 | 12/2021 | Panseri et al. |
| 2021/0399697 A1 | 12/2021 | Cheng et al. |
| 2022/0021348 A1 | 1/2022 | Philpott et al. |
| 2022/0216834 A1 | 7/2022 | Myoung et al. |
| 2022/0360229 A1 | 11/2022 | Khlat |
| 2022/0407462 A1 | 12/2022 | Khlat |
| 2022/0407463 A1 | 12/2022 | Khlat et al. |
| 2022/0407464 A1 | 12/2022 | Khlat et al. |
| 2022/0407465 A1 | 12/2022 | Khlat |
| 2022/0407478 A1 | 12/2022 | Khlat et al. |
| 2022/0416730 A1 | 12/2022 | Su et al. |
| 2023/0009653 A1 | 1/2023 | Vejlgaard et al. |
| 2023/0065760 A1 | 3/2023 | Hellberg |
| 2023/0079153 A1 | 3/2023 | Khlat |
| 2023/0080621 A1 | 3/2023 | Khlat |
| 2023/0080652 A1 | 3/2023 | Khlat et al. |
| 2023/0081095 A1 | 3/2023 | Khlat |
| 2023/0082145 A1 | 3/2023 | Lin et al. |
| 2023/0140184 A1 | 5/2023 | Zhu et al. |
| 2023/0155614 A1 | 5/2023 | Jelonnek et al. |
| 2023/0238927 A1 | 7/2023 | Kay et al. |
| 2023/0318537 A1 | 10/2023 | Scott et al. |
| 2023/0344477 A1 | 10/2023 | Kovacic et al. |
| 2023/0387859 A1 | 11/2023 | Drogi et al. |
| 2023/0387860 A1 | 11/2023 | Khlat et al. |
| 2023/0387861 A1 | 11/2023 | Maxim et al. |
| 2023/0421110 A1 | 12/2023 | Maxim et al. |
| 2023/0421111 A1 | 12/2023 | Khlat et al. |
| 2023/0421112 A1 | 12/2023 | Scott et al. |
| 2023/0421120 A1 | 12/2023 | Maxim et al. |
| 2024/0372665 A1 | 11/2024 | Khoryaev et al. |
| 2024/0426954 A1 | 12/2024 | Guan et al. |

FOREIGN PATENT DOCUMENTS

| | | |
|---|---|---|
| CN | 1326321 C | 12/2001 |
| CN | 1550064 A | 11/2004 |
| CN | 1706096 A | 12/2005 |
| CN | 101036289 A | 9/2007 |
| CN | 101651459 A | 2/2010 |
| CN | 105812073 A | 7/2016 |
| CN | 107483021 A | 12/2017 |
| CN | 110798155 A | 2/2020 |
| CN | 110855251 A | 2/2020 |
| CN | 111064438 A | 4/2020 |
| CN | 210693998 U | 6/2020 |
| CN | 112995079 A | 6/2021 |
| CN | 113055324 A | 6/2021 |
| CN | 113659938 A | 11/2021 |
| CN | 113055324 B | 12/2021 |
| CN | 116015223 A | 4/2023 |
| CN | 113659938 B | 5/2023 |
| CN | 116794580 A | 9/2023 |
| CN | 117134711 A | 11/2023 |
| CN | 118117977 A | 5/2024 |
| CN | 118648236 A | 9/2024 |
| CN | 118872201 A | 10/2024 |
| CN | 118117977 B | 11/2024 |
| CN | 119072847 A | 12/2024 |
| CN | 119096468 A | 12/2024 |
| EP | 2705604 A2 | 3/2014 |
| EP | 2582041 B1 | 4/2018 |
| EP | 2232713 B1 | 10/2018 |
| EP | 3416340 A1 | 12/2018 |
| JP | 2011211533 A | 10/2011 |
| JP | 2015099972 A | 5/2015 |
| KR | 20110105319 A | 9/2011 |
| KR | 101334652 B1 | 12/2013 |
| WO | 2007092794 A2 | 8/2007 |
| WO | 2010011551 A2 | 1/2010 |
| WO | 2010135711 A1 | 11/2010 |
| WO | 2012151594 A2 | 11/2012 |
| WO | 2014026178 A1 | 2/2014 |
| WO | 2021042088 A2 | 3/2021 |
| WO | 2023147211 A1 | 8/2023 |
| WO | 2023150539 A1 | 8/2023 |
| WO | 2023150545 A1 | 8/2023 |
| WO | 2023150587 A1 | 8/2023 |
| WO | 2023235070 A1 | 12/2023 |
| WO | 2023249771 A1 | 12/2023 |
| WO | 2023249889 A1 | 12/2023 |

OTHER PUBLICATIONS

Final Office Action for U.S. Appl. No. 17/689,232, mailed Mar. 26, 2024, 28 pages.

Supplemental Notice of Allowability for U.S. Appl. No. 17/700,700, mailed Feb. 28, 2024, 5 pages.

Advisory Action U.S. Appl. No. 17/689,232, mailed May 23, 2024, 3 pages.

Non-Final Office Action for U.S. Appl. No. 17/689,232, mailed Jul. 17, 2024, 22 pages.

Final Office Action for U.S. Appl. No. 17/939,350, mailed May 21, 2024, 11 pages.

Non-Final Office Action for U.S. Appl. No. 17/700,826, mailed May 15, 2024, 28 pages.

International Search Report and Written Opinion for International Patent Application No. PCT/US2023/061734, mailed May 30, 2023, 15 pages.

International Search Report and Written Opinion for International Patent Application No. PCT/US2023/061741, mailed Jun. 1, 2023, 14 pages.

Invitation to Pay Additional Fees and Partial International Search for International Patent Application No. PCT/US2023/061804, mailed May 26, 2023, 10 pages.

International Search Report and Written Opinion for International Patent Application No. PCT/US2023/061804, mailed Jul. 17, 2023, 20 pages.

Fu, J.-S. et al., "Improving Power Amplifier Efficiency and Linearity Using a Dynamically Controlled Tunable Matching Network," IEEE Transactions on Microwave Theory and Techniques, vol. 56, No. 12, Dec. 2008, pp. 3239-3244.

Kim, S. et al., "A Tunable Power Amplifier Employing Digitally Controlled Accumulation-mode Varactor Array for 2.4-GHz Short-range Wireless Communication," 2016 IEEE Asia Pacific Conference on Circuits and Systems (APCCAS), Oct. 25-28, 2016, Jeju, Korea (South), IEEE, pp. 269-272.

Wang, T.-P., "A Fully Integrated W-Band Push-Push CMOS VCO With Low Phase Noise and Wide Tuning Range," IEEE Transactions on Ultrasonics, Ferroelectrics, and Frequency Control, vol. 58, No. 7, Jul. 2011, IEEE, pp. 1307-1319.

Wanner, R. et al., "Monolithically Integrated SiGe Push-Push Oscillators in the Frequency Range 50-190 GHZ," 2006 IEEE Ninth International Symposium on Spread Spectrum Techniques and Applications, Aug. 28-31, 2006, Manaus, Brazil, IEEE, pp. 26-30.

Hammi et al., "Temperature Compensated Digital Predistorter for 3G Power Amplifiers," Electronics, Circuit and Systems, 2005, Dec. 11, 2005, pp. 1-4.

Hao et al., "Hybrid Analog/Digital Linearization Based on Dual-Domain Decomposition of Nonlinearity," 2019 IEEE Asia-Pacific Microwave Conference, Dec. 10, 2019, pp. 156-158.

(56)                    References Cited

OTHER PUBLICATIONS

Lee et al., "Fully Automated Adaptive Analog Predistortion Power Amplifier in WCDMA Applications," 2005 European Microwave Conference CNIT La Defense, Paris, France, vol. 2, Oct. 4, 2005, pp. 967-970.

Li et al., "Analog Predistorter Averaged Digital Predistortion for Power Amplifiers in Hybrid Beam-Forming Multi-Input Multi-Output Transmitter," IEEE Access, vol. 8, Aug. 1, 2020, pp. 146145-146153.

Tome et al., "Hybrid Analog/Digital Linearizatio nof GaN HEMT-Based Power Amplifiers," IEEE Transactions on Microwave Theory and Techniques, vol. 67, No. 1, Jan. 1, 2019, pp. 288-294.

Notice of Allowance for U.S. Appl. No. 17/689,232, mailed Oct. 21, 2024, 10 pages.

Notice of Allowance for U.S. Appl. No. 17/714,244, mailed Sep. 16, 2024, 8 pages.

Non-Final Office Action for U.S. Appl. No. 17/939,350, mailed Sep. 6, 2024, 8 pages.

Non-Final Office Action for U.S. Appl. No. 17/890,538, mailed Oct. 21, 2024, 13 pages.

Notice of Allowance and Examiner-Initiated Interview Summary for U.S. Appl. No. 17/700,826, mailed Sep. 11, 2024, 10 pages.

International Search Report and Written Opinion for International Patent Application No. PCT/US2023/060803, mailed May 19, 2023, 13 pages.

International Search Report and Written Opinion for International Patent Application No. PCT/US2023/060804, mailed May 4, 2023, 19 pages.

International Search Report and Written Opinion for International Patent Application No. PCT/US2023/025512, mailed Sep. 28, 2023, 13 pages.

International Search Report and Written Opinion for International Patent Application No. PCT/US2022/043600, mailed Jan. 11, 2023, 15 pages.

Non-Final Office Action for U.S. Appl. No. 17/942,472, mailed Feb. 16, 2023, 13 pages.

Extended European Search Report for European Patent Application No. 22195382.1, mailed Feb. 1, 2023, 26 pages.

Extended European Search Report for European Patent Application No. 22195683.2, mailed Feb. 10, 2023, 12 pages.

Non-Final Office Action for U.S. Appl. No. 17/700,700, mailed Apr. 13, 2023, 11 pages.

Bai, W.-D. et al., "Principle of Vector Synthesis Predistortion Linearizers Controlling AM/AM and AM/PM Independently," 2016 IEEE International Conference on Ubiquitous Wireless Broadband (ICUWB), Oct. 16-19, 2016, Nanjing, China, IEEE, 3 pages.

Extended European Search Report for European Patent Application No. 22195695.6, mailed Feb. 14, 2023, 12 pages.

Extended European Search Report for European Patent Application No. 22196188.1, mailed Feb. 2, 2023, 25 pages.

International Search Report and Written Opinion for International Patent Application No. PCT/US2023/060303, mailed Apr. 11, 2023, 12 pages.

Final Office Action for U.S. Appl. No. 17/942,472, mailed Jul. 19, 2023, 16 pages.

Cho, M., "Analog Predistortion for Improvement of RF Power Amplifier Efficiency and Linearity," A Dissertation presented to the Academic Faculty in partial fulfillment of the requirements for the degree Doctor of Philosophy in the School of Electrical and Computer Engineering, Georgia Institute of Technology, Aug. 2016, available from the Internet: [URL: https://repository.gatech.edu/server/api/core/bitstreams/b8fe5cbb-e5db-4efe-b9a2-eaad5f671f14/content], 113 pages.

Kwak, T.-W. et al., "A 2W CMOS Hybrid Switching Amplitude Modulator for EDGE Polar Transmitters," IEEE Journal of Solid-State Circuits, vol. 42, No. 12, Dec. 2007, IEEE, pp. 2666-2676.

Paek, J.-S. et al., "A −137 dBm/Hz Noise, 82% Efficiency AC-Coupled Hybrid Supply Modulator With Integrated Buck-Boost Converter," IEEE Journal of Solid-State Circuits, vol. 51, No. 11, Nov. 2016, IEEE pp. 2757-2768.

Paek, J.-S. et al., "Design of Boosted Supply Modulator With Reverse Current Protection for Wide Battery Range in Envelope Tracking Operation," IEEE Transactions on Microwave Theory and Techniques, vol. 67, No. 1, Jan. 2019, pp. 183-194.

Williams, P., "Crossover Filter Shape Comparisons," White Paper, Linea Research, Jul. 2013, 13 pages.

Non-Final Office Action for U.S. Appl. No. 17/700,685, mailed Dec. 22, 2023, 24 pages.

Non-Final Office Action for U.S. Appl. No. 17/689,232, mailed Dec. 11, 2023, 27 pages.

Non-Final Office Action for U.S. Appl. No. 17/737,300, mailed Aug. 28, 2023, 14 pages.

Notice of Allowance and Examiner-Initiated Interview Summary for U.S. Appl. No. 17/737,300, mailed Dec. 19, 2023, 12 pages.

Corrected Notice of Allowability for U.S. Appl. No. 17/737,300, mailed Dec. 27, 2023, 8 pages.

Advisory Action for U.S. Appl. No. 17/942,472, mailed Sep. 15, 2023, 3 pages.

Notice of Allowance for U.S. Appl. No. 17/942,472, mailed Oct. 18, 2023, 10 pages.

Corrected Notice of Allowability for U.S. Appl. No. 17/942,472, mailed Nov. 17, 2023, 6 pages.

Notice of Allowance for U.S. Appl. No. 17/700,700, mailed Oct. 23, 2023, 9 pages.

Supplemental Notice of Allowability for U.S. Appl. No. 17/700,700, mailed Nov. 8, 2023, 5 pages.

Non-Final Office Action for U.S. Appl. No. 17/939,350, mailed Jan. 17, 2024, 11 pages.

Extended European Search Report for European Patent Application No. 23153108.8, mailed Jun. 20, 2023, 18 pages.

Extended European Search Report for European Patent Application No. 23174010.1, mailed Oct. 10, 2023, 10 pages.

International Search Report and Written Opinion for International Patent Application No. PCT/US2023/019267, mailed Aug. 3, 2023, 14 pages.

* cited by examiner

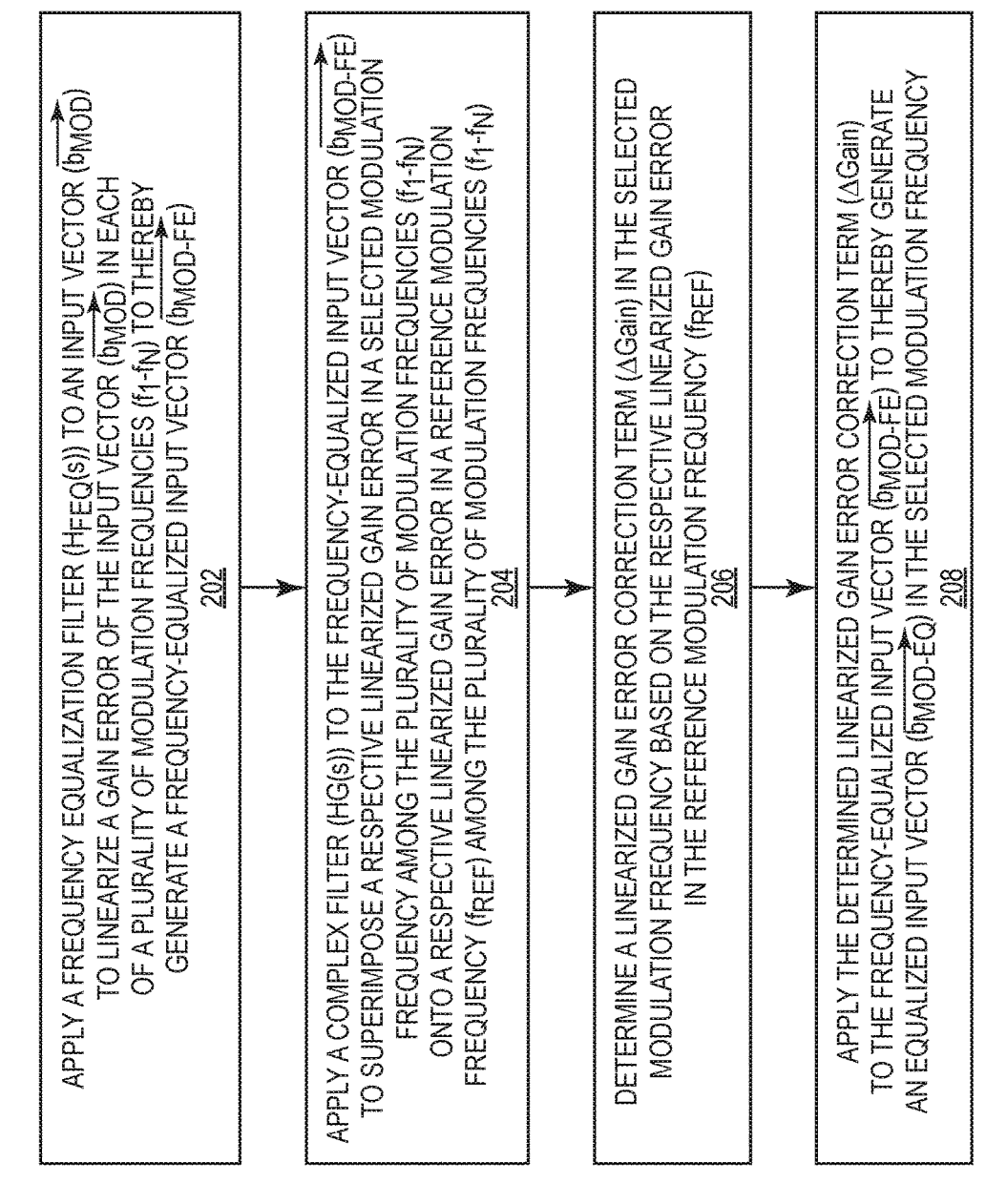

200

APPLY A FREQUENCY EQUALIZATION FILTER ($H_{FEQ}(s)$) TO AN INPUT VECTOR ($\overrightarrow{b_{MOD}}$) TO LINEARIZE A GAIN ERROR OF THE INPUT VECTOR ($\overrightarrow{b_{MOD}}$) IN EACH OF A PLURALITY OF MODULATION FREQUENCIES ($f_1$-$f_N$) TO THEREBY GENERATE A FREQUENCY-EQUALIZED INPUT VECTOR ($\overrightarrow{b_{MOD-FE}}$)
202

APPLY A COMPLEX FILTER ($HG(s)$) TO THE FREQUENCY-EQUALIZED INPUT VECTOR ($\overrightarrow{b_{MOD-FE}}$) TO SUPERIMPOSE A RESPECTIVE LINEARIZED GAIN ERROR IN A SELECTED MODULATION FREQUENCY AMONG THE PLURALITY OF MODULATION FREQUENCIES ($f_1$-$f_N$) ONTO A RESPECTIVE LINEARIZED GAIN ERROR IN A REFERENCE MODULATION FREQUENCY ($f_{REF}$) AMONG THE PLURALITY OF MODULATION FREQUENCIES ($f_1$-$f_N$)
204

DETERMINE A LINEARIZED GAIN ERROR CORRECTION TERM ($\Delta Gain$) IN THE SELECTED MODULATION FREQUENCY BASED ON THE RESPECTIVE LINEARIZED GAIN ERROR IN THE REFERENCE MODULATION FREQUENCY ($f_{REF}$)
206

APPLY THE DETERMINED LINEARIZED GAIN ERROR CORRECTION TERM ($\Delta Gain$) TO THE FREQUENCY-EQUALIZED INPUT VECTOR ($\overrightarrow{b_{MOD-FE}}$) TO THEREBY GENERATE AN EQUALIZED INPUT VECTOR ($\overrightarrow{b_{MOD-EQ}}$) IN THE SELECTED MODULATION FREQUENCY
208

*FIG. 6*

LOW-COMPLEXITY AMPLITUDE ERROR CORRECTION IN A WIRELESS COMMUNICATION CIRCUIT

RELATED APPLICATIONS

This application claims the benefit of U.S. provisional patent application Ser. No. 63/480,785, filed on Jan. 20, 2023, the disclosure of which is hereby incorporated herein by reference in its entirety.

FIELD OF THE DISCLOSURE

The technology of the disclosure relates generally to correcting an amplitude-amplitude (AM-AM) error in a wireless communication circuit.

BACKGROUND

Mobile communication devices have become increasingly common in current society for providing wireless communication services. The prevalence of these mobile communication devices is driven in part by the many functions that are now enabled on such devices. Increased processing capability in such devices means that mobile communication devices have evolved from being pure communication tools into sophisticated mobile multimedia centers that enable enhanced user experiences.

The redefined user experience relies on higher data rates offered by advanced fifth generation (5G) and 5G new radio (5G-NR) technologies, which typically transmit and receive radio frequency (RF) signals in millimeter wave spectrums. Given that the RF signals are more susceptible to attenuation and interference in the millimeter wave spectrums, the RF signals are typically amplified by state-of-the-art power amplifiers to help boost the RF signals to a higher power before transmission.

In a typical wireless communication circuit, a transceiver circuit is configured to generate an RF signal, a power management circuit is configured to generate a modulated voltage, a power amplifier circuit is configured to amplify the RF signal based on the modulated voltage, and an antenna circuit is configured to transmit the RF signal in one or more transmission frequencies. The power amplifier circuit can be further coupled to the antenna circuit via an RF frontend circuit (e.g., filter, switches, etc.). Notably, an output reflection coefficient (e.g., $S_{22}$) of the power amplifier circuit can interact with an input reflection coefficient (e.g., $S_{11}$) of the RF frontend circuit to cause a group delay in the RF signal to potentially create an amplitude-to-amplitude (AM-AM) error in the modulated voltage. As such, it is desirable to correct the AM-AM error in all of the transmission frequencies to help prevent undesired amplitude distortion, particularly when the RF signal is modulated across a wide modulation bandwidth (e.g., $\geq 200$ MHZ).

SUMMARY

Embodiments of the disclosure relate to low-complexity amplitude error correction in a wireless communication circuit. The wireless communication circuit includes a transceiver circuit, a power management integrated circuit (PMIC), and a power amplifier circuit(s). The transceiver circuit generates a radio frequency (RF) signal(s) from an input vector, the PMIC generates a modulated voltage, and the power amplifier circuit(s) amplifies the RF signal(s) based on the modulated voltage. When the power amplifier circuit(s) is coupled to an RF frontend circuit (e.g., filter/multiplexer), an output reflection coefficient (e.g., $S_{22}$) of the power amplifier circuit(s) can interact with an input reflection coefficient (e.g., $S_{11}$) of the RF frontend circuit to create a voltage distortion filter on an output stage of the power amplifier circuit(s), which can cause an unwanted amplitude-amplitude (AM-AM) error across a modulation bandwidth of the wireless communication circuit.

In this regard, in embodiments disclosed herein, the transceiver circuit is configured to equalize the input vector to thereby correct the AM-AM error across the modulation bandwidth. Unlike conventional methods where complicated memory digital predistortion (mDPD) coefficients must be defined and calibrated for each modulation frequency within the modulation bandwidth, the transceiver circuit is configured herein to eliminate modulation frequency dependency of the AM-AM error. As a result, it is possible to correct the AM-AM error across the modulation bandwidth with reduced complexity to thereby improve efficiency and linearity of the wireless communication circuit.

In one aspect, a transceiver circuit is provided. The transceiver circuit includes a frequency equalization circuit. The frequency equalization circuit is configured to apply a frequency equalization filter to an input vector to linearize a gain error of the input vector in each of multiple modulation frequencies to thereby generate a frequency-equalized input vector. The transceiver circuit also includes a gain error correction circuit. The gain error correction circuit is configured to apply a complex filter to the frequency-equalized input vector to superimpose a respective linearized gain error in a selected modulation frequency among the multiple modulation frequencies onto a respective linearized gain error in a reference modulation frequency among the multiple modulation frequencies. The gain error correction circuit is also configured to determine a linearized gain error correction term in the selected modulation frequency based on the respective linearized gain error in the reference modulation frequency. The gain error correction circuit is also configured to apply the determined linearized gain error correction term to the frequency-equalized input vector to thereby generate an equalized input vector in the selected modulation frequency.

In another aspect, a wireless device is provided. The wireless device includes a transceiver circuit. The transceiver circuit includes a frequency equalization circuit. The frequency equalization circuit is configured to apply a frequency equalization filter to an input vector to linearize a gain error of the input vector in each of multiple modulation frequencies to thereby generate a frequency-equalized input vector. The transceiver circuit also includes a gain error correction circuit. The gain error correction circuit is configured to apply a complex filter to the frequency-equalized input vector to superimpose a respective linearized gain error in a selected modulation frequency among the multiple modulation frequencies onto a respective linearized gain error in a reference modulation frequency among the multiple modulation frequencies. The gain error correction circuit is also configured to determine a linearized gain error correction term in the selected modulation frequency based on the respective linearized gain error in the reference modulation frequency. The gain error correction circuit is also configured to apply the determined linearized gain error correction term to the frequency-equalized input vector to thereby generate an equalized input vector in the selected modulation frequency.

In another aspect, a method for correcting an amplitude error in a wireless device is provided. The method includes applying a frequency equalization filter to an input vector to linearize a gain error of the input vector in each of multiple modulation frequencies to thereby generate a frequency-equalized input vector. The method also includes applying a complex filter to the frequency-equalized input vector to superimpose a respective linearized gain error in a selected modulation frequency among the multiple modulation frequencies onto a respective linearized gain error in a reference modulation frequency among the multiple modulation frequencies. The method also includes determining a linearized gain error correction term in the selected modulation frequency based on the respective linearized gain error in the reference modulation frequency. The method also includes applying the determined linearized gain error correction term to the frequency-equalized input vector to thereby generate an equalized input vector in the selected modulation frequency.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 6 is a flowchart of an exemplary process for correcting an amplitude error in the user element of FIG. 5.

DETAILED DESCRIPTION

Figure 1:
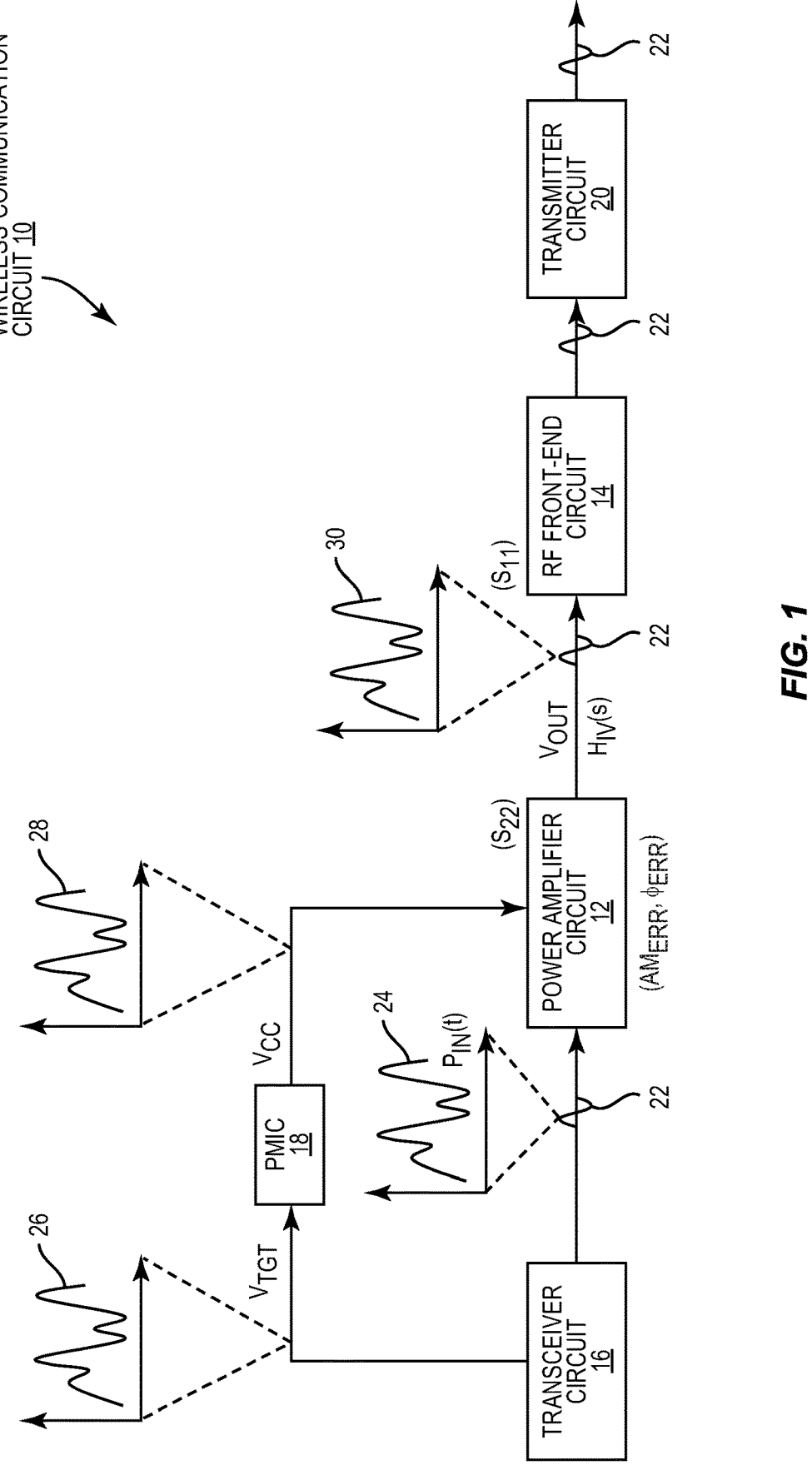
FIG. 1 is a schematic diagram of an exemplary wireless communication circuit, wherein an unwanted voltage distortion filter may cause an amplitude-amplitude (AM-AM) error in a power amplifier circuit when the power amplifier circuit is coupled to a radio frequency (RF) frontend circuit.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to low-complexity amplitude error correction in a wireless communication circuit. The wireless communication circuit includes a transceiver circuit, a power management integrated circuit (PMIC), and a power amplifier circuit(s). The transceiver circuit generates a radio frequency (RF) signal(s) from an input vector, the PMIC generates a modulated voltage, and the power amplifier circuit(s) amplifies the RF signal(s)

based on the modulated voltage. When the power amplifier circuit(s) is coupled to an RF frontend circuit (e.g., filter/multiplexer), an output reflection coefficient (e.g., $S_{22}$) of the power amplifier circuit(s) can interact with an input reflection coefficient (e.g., $S_{11}$) of the RF frontend circuit to create a voltage distortion filter on an output stage of the power amplifier circuit(s), which can cause an unwanted amplitude-amplitude (AM-AM) error across a modulation bandwidth of the wireless communication circuit.

In this regard, in embodiments disclosed herein, the transceiver circuit is configured to equalize the input vector to thereby correct the AM-AM error across the modulation bandwidth. Unlike conventional methods where complicated memory digital predistortion (mDPD) coefficients must be defined and calibrated for each modulation frequency within the modulation bandwidth, the transceiver circuit is configured herein to eliminate modulation frequency dependency of the AM-AM error. As a result, it is possible to correct the AM-AM error across the modulation bandwidth with reduced complexity to thereby improve efficiency and linearity of the wireless communication circuit.

FIG. 1 is a schematic diagram of an exemplary wireless communication circuit 10 (a.k.a. wireless device), wherein an unwanted voltage distortion filter $H_{IV}(s)$ may cause an AM-AM error in a power amplifier circuit 12 when the power amplifier circuit 12 is coupled to a radio frequency (RF) frontend circuit 14. Notably, in the unwanted voltage distortion filter $H_{IV}(s)$, "s" is a notation of Laplace transform. The wireless communication circuit 10 includes a transceiver circuit 16, and a power management integrated circuit (PMIC) 18, and a transmitter circuit 20, which can include an antenna(s) (not shown) as an example.

The transceiver circuit 16 is configured to generate an RF signal 22 having a time-variant input power $P_{IN}(t)$ that corresponds to a time-variant voltage envelope 24 and provides the RF signal 22 to the power amplifier circuit 12. The transceiver circuit 16 is also configured to generate a time-variant target voltage $V_{TGT}$, which is associated with a time-variant target voltage envelope 26 that tracks the time-variant voltage envelope 24 of the RF signal 22. The PMIC 18 is configured to generate a modulated voltage $V_{CC}$ having a time-variant modulated voltage envelope 28 (e.g., an average power tracking voltage) that tracks the time-variant target voltage envelope 26 of the time-variant target voltage $V_{TGT}$ and provides the modulated voltage $V_{CC}$ to the power amplifier circuit 12. The power amplifier circuit 12 is configured to amplify the RF signal 22 based on the modulated voltage $V_{CC}$ to a time-variant output voltage $V_{OUT}$ associated with a time-variant output voltage envelope 30. The power amplifier circuit 12 then provides the amplified RF signal 22 to the RF frontend circuit 14. The RF frontend circuit 14 may be a filter circuit that performs further frequency filtering on the amplified RF signal 22 before providing the amplified RF signal 22 to the transmitter circuit 20 for transmission.

When the power amplifier circuit 12 is coupled to the RF frontend circuit 14, the unwanted voltage distortion filter $H_{IV}(s)$ can cause a frequency-dependent AM-AM error across all modulation frequencies across the modulation bandwidth. For a detailed analysis as to how the unwanted voltage distortion filter $H_{IV}(s)$ can be created by the coupling of the power amplifier circuit 12 and the RF frontend circuit 14, please refer to U.S. Pat. No. 12,284,003, entitled "PHASE AND AMPLITUDE ERROR CORRECTION IN A TRANSMISSION CIRCUIT."

Figure 2:
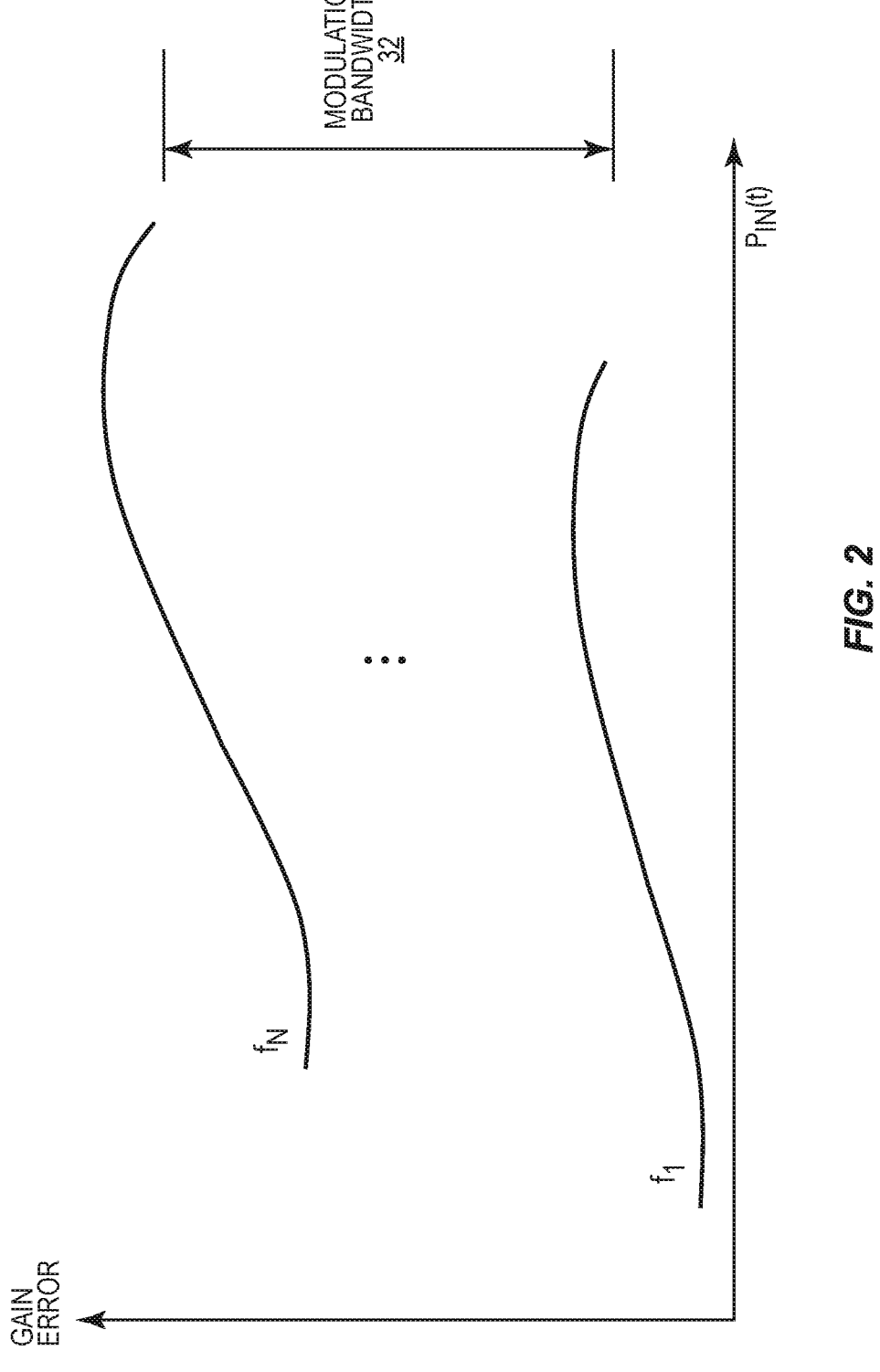
FIG. 2 is a graphic diagram illustrating a distribution of the AM-AM error across a modulation bandwidth of the wireless communication circuit of FIG. 1.

FIG. 2 is a graphic diagram illustrating a distribution of the AM-AM error across an entire modulation bandwidth 32 of the wireless communication circuit 10 of FIG. 1. The modulation bandwidth 32 includes multiple modulation frequencies $f_1$-$f_N$. Each of the modulation frequencies $f_1$-$f_N$ corresponds to a respective time-variant gain error that is dependent on the time-variant input power $P_{IN}(t)$. In other words, the gain error has a dependency on both the modulation frequencies $f_1$-$F_N$ and the time-variant input power $P_{IN}(t)$.

A conventional approach for correcting such gain error is to employ a memory digital predistortion (mDPD) circuit in the transceiver circuit 16 to inject a gain error correction term into the RF signal 22. However, given the frequency and power dependency of the gain error, the mDPD circuit must define and calibrate a respective set of complex coefficients for each of the modulation frequencies $f_1$-$f_N$. Notably, to operate in a fifth generation (5G) or a 5G new-radio (5G-NR) system, the wireless communication circuit 10 often needs to support a wide modulation bandwidth (e.g., >200 MHZ). As such, a number of the modulation frequencies $f_1$-$f_N$ can increase significantly, thus leading to a significantly increased complexity with respect to implementation and calibration of the mDPD coefficients. Hence, it is desirable to enhance the wireless communication circuit 10 based on a low-complexity AM-AM error correction scheme to effectively correct the gain error across the entire modulation bandwidth 32.

Figure 3:
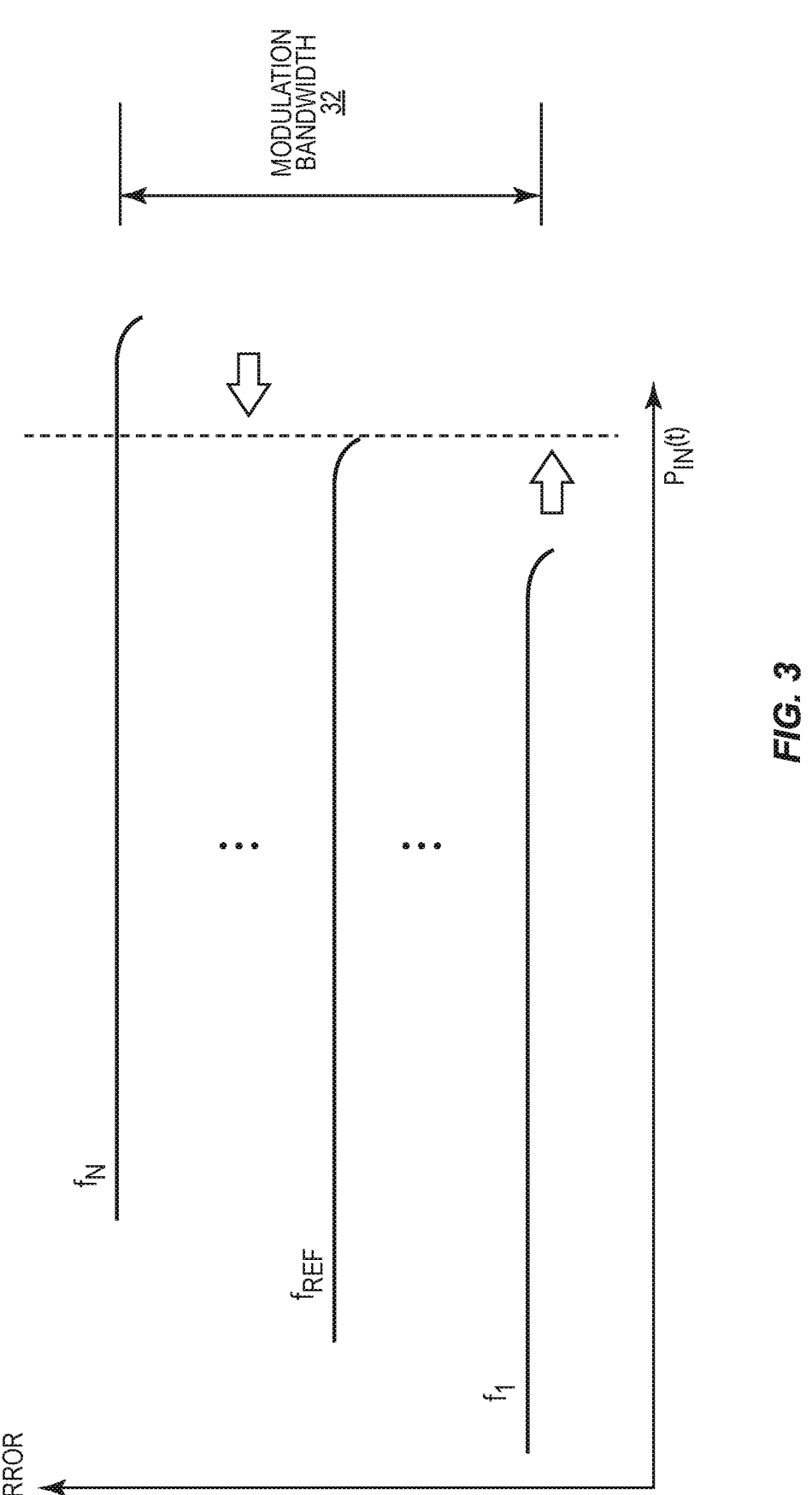
FIG. 3 is a graphic diagram illustrating a low-complexity AM-AM error correction scheme that can effectively correct the AM-AM error in the wireless communication circuit of FIG. 1.

FIG. 3 is a graphic diagram illustrating a low-complexity AM-AM error correction scheme that can effectively correct the AM-AM error in the wireless communication circuit 10 of FIG. 1. Herein, the low-complexity AM-AM correction scheme is able to reduce complexity associated with AM-AM error correction by eliminating modulation frequency dependency of the gain error.

First of all, the gain error associated with each of the modulation frequencies $f_1$-$f_N$ is first linearized with respect to the time-variant input power $P_{IN}(t)$. As shown in FIG. 3, the linearized gain error associated with each of the modulation frequencies $f_1$-$f_N$ is independent from the time-variant input power $P_{IN}(t)$.

Next, a reference modulation frequency $f_{REF}$ among the modulation frequencies $f_1$-$f_N$ is chosen and a set of linearized gain error correction terms is defined for the reference modulation frequency $f_{REF}$. In a non-limiting example, the reference modulation frequency $f_{REF}$ can be a center modulation frequency among the modulation frequencies $f_1$-$f_N$.

Subsequently, the linearized gain error of any selected one of the modulation frequencies $f_1$-$f_N$ can be superimposed onto the linearized gain error of the reference modulation frequency $f_{REF}$. Herein, the phrase "superimposing" refers to a process for determining an appropriate x-axis shift (e.g., a vector) to align a respective linearized gain error of any selected one of the modulation frequencies $f_1$-$f_N$ with the respective linearized gain error of the reference modulation frequency $f_{REF}$.

As shown in FIG. 3, superimposing the linearized gain error of the modulation frequency $f_1$ onto the linearized gain error of the reference modulation frequency $f_{REF}$ is equivalent to shifting the linearized gain error of the modulation frequency $f_1$ rightward along the x-axis. Likewise, superimposing the linearized gain error of the modulation frequency $f_N$ onto the linearized gain error of the reference modulation frequency $f_{REF}$ is equivalent to shifting the linearized gain error of the modulation frequency $f_N$ leftward along the x-axis. By superimposing the linearized gain error of each of the modulation frequencies $f_1$-$f_N$ onto the linearized gain error of the reference modulation frequency $f_{REF}$, it is possible to determine a respective linearized gain error correction term for each of the modulation frequencies $f_1$-$f_N$ based on the set of linearized gain error correction terms defined for the reference modulation frequency $f_{REF}$. In this regard, the complexity associated with AM-AM error correction only revolves around the reference modulation frequency $f_{REF}$, as opposed to having to involve all the modulation frequencies $f_1$-$f_N$. As a result, the low-complexity AM-AM error correction scheme, as further described in FIG. 4 below, is clearly advantageous over the conventional methods where complicated mDPD coefficients must be defined and calibrated for each of the modulation frequencies $f_1$-$f_N$.

Figure 4:
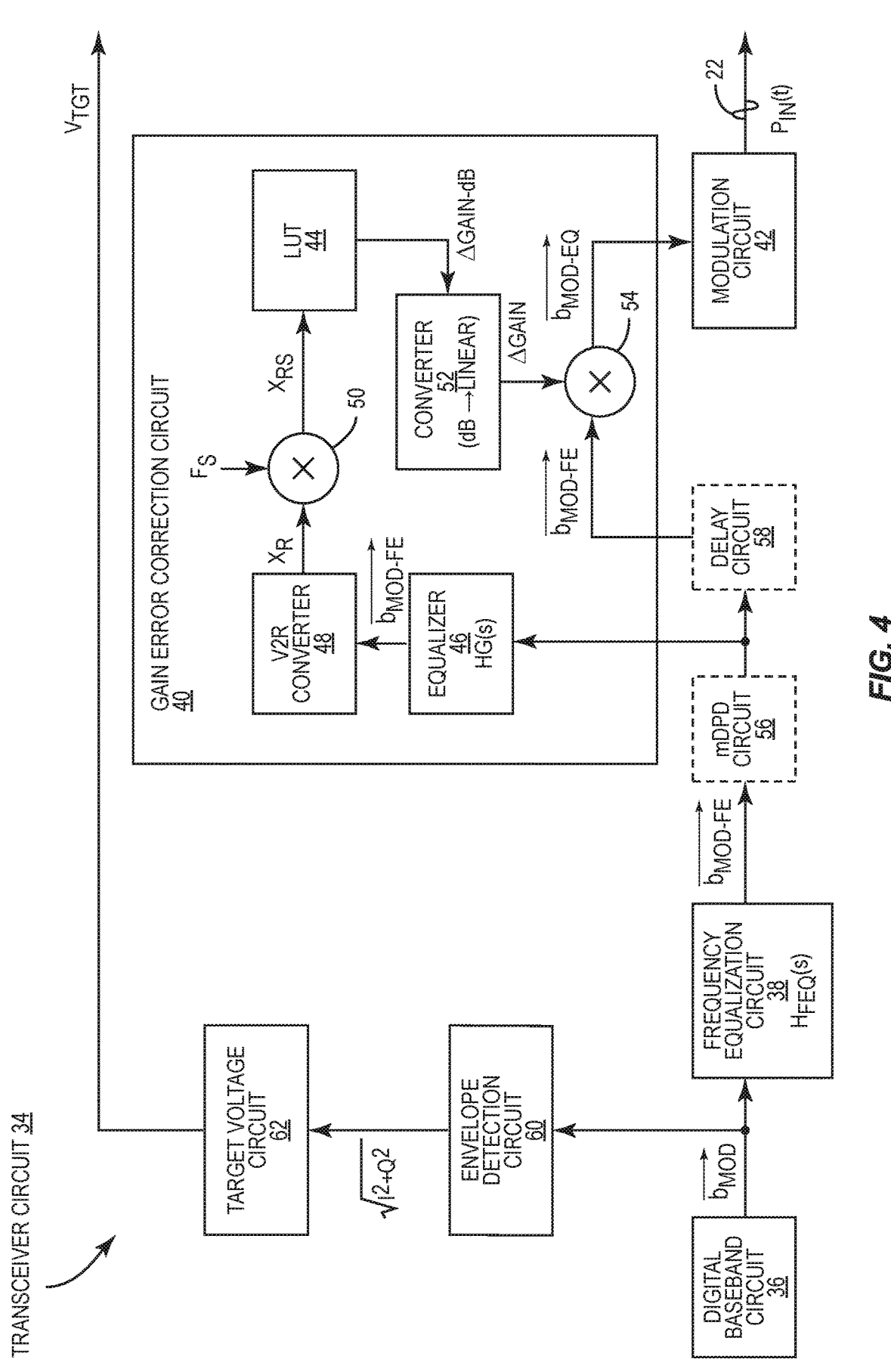
FIG. 4 is a schematic diagram of an exemplary transceiver circuit configured to correct the AM-AM error in the wireless communication circuit based on the low-complexity AM-AM error correction scheme described in FIG. 3.

FIG. 4 is a schematic diagram of an exemplary transceiver circuit 34 configured to correct the AM-AM error in the wireless communication circuit 10 based on the low-complexity AM-AM error correction scheme described in FIG. 3. The transceiver circuit 34 can be provided in the wireless communication circuit 10 to replace the transceiver circuit 16. By replacing the transceiver circuit 16 with the transceiver circuit 34, the wireless communication circuit 10 can be adapted to support the low-complexity AM-AM error correction scheme of the present disclosure.

The transceiver circuit 34 includes a digital baseband circuit 36, a frequency equalization circuit 38, a gain error correction circuit 40, and a modulation circuit 42. In an embodiment, the gain error correction circuit 40 includes a lookup table (LUT) circuit 44, which may be preprogrammed to store a set of decibel gain error correction terms ΔGain-dB associated with the reference modulation frequency $f_{REF}$. As previously described in FIG. 3, each of the modulation frequencies $f_1$-$f_N$ can be superimposed on the reference modulation frequency $f_{REF}$ by shifting a respective one of the modulation frequencies $f_1$-$f_N$ leftward or rightward. In this regard, in a non-limiting example, the LUT circuit 44 can be programmed to correlate different amounts of a leftward or rightward shift with different decibel gain error correction terms ΔGain-dB. As such, once the amount of the leftward or rightward shift associated with a respective one of the modulation frequencies $f_1$-$f_N$ is determined, the LUT circuit 44 will be able to provide a corresponding decibel gain error correction term ΔGain-dB for the respective one of the modulation frequencies $f_1$-$f_N$.

The digital baseband circuit 36 is configured to generate an input vector $\overrightarrow{b_{MOD}}$ in a selected modulation frequency among the modulation frequencies $f_1$-$f_N$ across the modulation bandwidth 32. The frequency equalization circuit 38 is configured to apply a frequency equalization filter $H_{FEQ}(s)$ to the input vector $\overrightarrow{b_{MOD}}$ to generate a frequency-equalized input vector $\overrightarrow{b_{MOD-FE}}$, in which the respective gain error in each of the modulation frequencies $f_1$-$f_N$ is linearized. As previously illustrated in FIG. 3, the linearized gain error associated with each of the modulation frequencies $f_1$-$f_N$ becomes independent from the time-variant input power $P_{IN}(t)$.

In an embodiment, the gain error correction circuit 40 includes an equalizer circuit 46, a vector-to-real (V2R) converter 48, a scaler 50, a converter circuit 52, and a multiplier circuit 54. The equalizer circuit 46 is configured to apply a complex filter HG(s) to the frequency-equalized input vector $\overrightarrow{b_{MOD-FE}}$ to superimpose the respective linearized gain error in a selected one of the modulation frequencies $f_1$-$f_N$ onto the respective linearized gain error in the reference modulation frequency $f_{REF}$.

The V2R converter 48 is configured to extract a real parameter $X_R$ from the superimposed frequency-equalized input vector $\overrightarrow{b_{MOD-FE}}$. The scaler 50 may be configured to scale the real parameter $X_R$ based on a scaling factor Fs to generate a scaled real parameter $X_{RS}$. According to an embodiment of the present disclosure, the scaled real parameter $X_{RS}$ represents an amount of the leftward (e.g., a negative number) or rightward (e.g., a positive number) shift that is required to superimpose the linearized gain error of the selected one of the modulation frequencies $f_1$-$f_N$ onto the linearized gain error of the reference modulation frequency $f_{REF}$. Understandably, if the selected one of the modulation frequencies $f_1$-$f_N$ is the same as the reference modulation frequency $f_{REF}$, then the leftward or rightward shift will not be needed.

Based on the scaled real parameter $X_{RS}$, the LUT circuit 44 is able to determine a corresponding decibel gain error correction term ΔGain-dB in the reference modulation frequency $f_{REF}$. The converter circuit 52 then converts the decibel gain error correction term ΔGain-dB into a linearized gain error correction term ΔGain for the selected one of the modulation frequencies $f_1$-$f_N$. Accordingly, the multiplier circuit 54 can multiply the linearized gain error correction term ΔGain with the frequency-equalized input vector $\overrightarrow{b_{MOD-FE}}$ to thereby generate an equalized input vector $\overrightarrow{b_{MOD-EQ}}$ that can correct the AM-AM error in the power amplifier circuit 12 in FIG. 1. Subsequently, the modulation circuit 42 can convert the equalized input vector $\overrightarrow{b_{MOD-EQ}}$ into the RF signal 22 and modulate the RF signal 22 onto an intermediate frequency (IF) or a carrier frequency.

The transceiver circuit 34 may include an mDPD circuit 56. In an embodiment, the mDPD circuit 56 can be configured to correct any residual gain error in the equalized input vector $\overrightarrow{b_{MOD-EQ}}$. The transceiver circuit 34 may also include a delay circuit 58, which can be configured to delay the frequency-equalized input vector $\overrightarrow{b_{MOD-FE}}$ to compensate for a group delay associated with the gain error correction circuit 40.

The transceiver circuit 34 further includes an envelope detection circuit 60 and a target voltage circuit 62. The envelope detection circuit 60 is configured to detect a time-variant amplitude envelope $\sqrt{I^2+Q^2}$ of the input vector $\overrightarrow{b_{MOD}}$, wherein "I" and "Q" represent an in-phase component and a quadrature component of the input vector $\overrightarrow{b_{MOD}}$, respectively. The target voltage circuit 62 is configured to generate the time-variant target voltage $V_{TGT}$ that keeps track of the time-variant amplitude envelope $\sqrt{I^2+Q^2}$ of the input vector $\overrightarrow{b_{MOD}}$.

Figure 5:
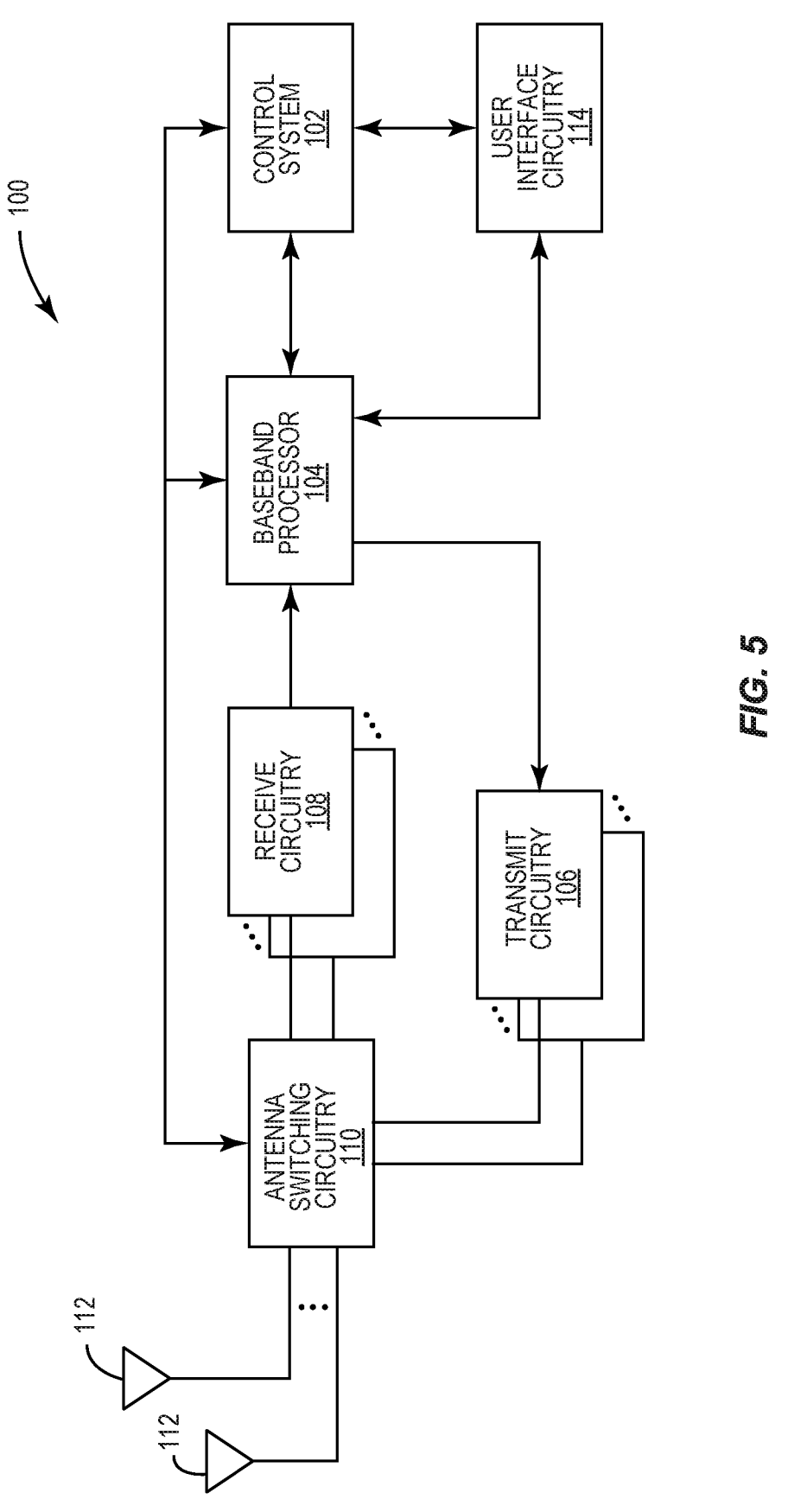
FIG. 5 is a schematic diagram of an exemplary user element (e.g., wireless device) wherein the transceiver circuit of FIG. 4 can be provided.

The transceiver circuit 34 of FIG. 4 can be provided in a user element (e.g., wireless device) to provide the low-complexity AM-AM error correction according to the embodiments described above. In this regard, FIG. 5 is a schematic diagram of an exemplary user element 100 wherein the transceiver circuit 34 of FIG. 4 can be provided.

Herein, the user element 100 can be any type of user elements, such as mobile terminals, smart watches, tablets, computers, navigation devices, access points, and like wireless communication devices that support wireless communications, such as cellular, wireless local area network (WLAN), Bluetooth, and near field communications. The user element 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 112 through the antenna switching circuitry 110. The multiple antennas 112 and the replicated transmit and receive circuitries 106, 108 may provide spatial diversity. Modulation and processing details will be understood by those skilled in the art.

The user element 100 of FIG. 5 can be configured to correct amplitude error based on a process. In this regard, FIG. 6 is a flowchart of an exemplary process 200 for correcting amplitude error in the user element 100 of FIG. 5.

Specifically, the process 200 includes applying the frequency equalization filter $H_{FEQ}(s)$ to the input vector $\overrightarrow{b_{MOD}}$ to linearize the gain error of the input vector $\overrightarrow{b_{MOD}}$ in each of the modulation frequencies $f_1$-$f_N$ to thereby generate the frequency-equalized input vector $\overrightarrow{b_{MOD\text{-}FE}}$ (step 202). The process 200 also includes applying the complex filter HG(s) to the frequency-equalized input vector $\overrightarrow{b_{MOD\text{-}FE}}$ to superimpose the respective linearized gain error in the selected modulation frequency among the modulation frequencies ($f_1$-$f_N$) onto the respective linearized gain error in the reference modulation frequency $f_{REF}$ among the modulation frequencies $f_1$-$f_N$ (step 204). The process 200 also includes determining the linearized gain error correction term $\Delta$Gain in the selected modulation frequency based on the respective linearized gain error in the reference modulation frequency $f_{REF}$ (step 206). The process 200 also includes applying the determined linearized gain error correction term $\Delta$Gain to the frequency-equalized input vector $\overrightarrow{b_{MOD\text{-}FE}}$ to thereby generate the equalized input vector $\overrightarrow{b_{MOD\text{-}EQ}}$ in the selected modulation frequency (step 208).

Those skilled in the art will recognize improvements and modifications to the preferred embodiments of the present disclosure. All such improvements and modifications are considered within the scope of the concepts disclosed herein and the claims that follow.

What is claimed is:

1. A transceiver circuit comprising:
a frequency equalization circuit configured to apply a frequency equalization filter to an input vector to linearize a gain error of the input vector in each of a plurality of modulation frequencies to thereby generate a frequency-equalized input vector; and
a gain error correction circuit configured to:
apply a complex filter to the frequency-equalized input vector to superimpose a respective linearized gain error in a selected modulation frequency among the plurality of modulation frequencies onto a respective linearized gain error in a reference modulation frequency among the plurality of modulation frequencies;
determine a linearized gain error correction term in the selected modulation frequency based on the respective linearized gain error in the reference modulation frequency; and
apply the determined linearized gain error correction term to the frequency-equalized input vector to thereby generate an equalized input vector in the selected modulation frequency.

2. The transceiver circuit of claim 1, wherein the gain error correction circuit comprises:
an equalizer circuit configured to apply the complex filter to the frequency-equalized input vector to superimpose the respective linearized gain error in the selected modulation frequency onto the respective linearized gain error in the reference modulation frequency;
a vector-to-real (V2R) converter configured to extract a real parameter from the superimposed frequency-equalized input vector, wherein the real parameter indicates an amount of shift that is required to superimpose the respective linearized gain error in the selected modulation frequency onto the respective linearized gain error in the reference modulation frequency;
a scaler configured to scale the real parameter based on a scaling factor to thereby generate a scaled real parameter;
a lookup table (LUT) circuit configured to determine a decibel gain error correction term in the reference modulation frequency based on the scaled real parameter;
a converter circuit configured to convert the decibel gain error correction term into the linearized gain error correction term; and
a multiplier circuit configured to multiply the linearized gain error correction term with the frequency-equalized input vector to thereby generate the equalized input vector.

3. The transceiver circuit of claim 1, further comprising a digital baseband circuit configured to generate the input vector in the selected modulation frequency.

4. The transceiver circuit of claim 1, further comprising a modulation circuit configured to convert the equalized input vector into a radio frequency (RF) signal and modulate the RF signal onto one of an intermediate frequency and a carrier frequency.

5. The transceiver circuit of claim 1, further comprising a memory digital predistortion (mDPD) circuit configured to correct a residual gain error in the equalized input vector.

6. The transceiver circuit of claim 1, further comprising a delay circuit configured to delay the frequency-equalized input vector to compensate for a group delay associated with the gain error correction circuit.

7. The transceiver circuit of claim 1, further comprising:
a digital baseband circuit configured to generate the input vector in the selected modulation frequency;
a modulation circuit configured to convert the equalized input vector into a radio frequency (RF) signal and modulate the RF signal onto one of an intermediate frequency and a carrier frequency;
a memory digital predistortion (mDPD) circuit configured to correct a residual gain error in the equalized input vector; and
a delay circuit configured to delay the frequency-equalized input vector to compensate for a group delay associated with the gain error correction circuit.

8. The transceiver circuit of claim 1, wherein the reference modulation frequency is a center modulation frequency among the plurality of modulation frequencies.

9. The transceiver circuit of claim 1, further comprising:
an envelope detection circuit configured to detect a time-variant amplitude envelope of the input vector; and
a target voltage circuit configured to generate a time-variant target voltage envelope that keeps track of the time-variant amplitude envelope of the input vector.

10. A wireless device comprising a transceiver circuit comprising:
a frequency equalization circuit configured to apply a frequency equalization filter to an input vector to linearize a gain error of the input vector in each of a plurality of modulation frequencies to thereby generate a frequency-equalized input vector; and
a gain error correction circuit configured to:
apply a complex filter to the frequency-equalized input vector to superimpose a respective linearized gain error in a selected modulation frequency among the plurality of modulation frequencies onto a respective linearized gain error in a reference modulation frequency among the plurality of modulation frequencies;
determine a linearized gain error correction term in the selected modulation frequency based on the respective linearized gain error in the reference modulation frequency; and
apply the determined linearized gain error correction term to the frequency-equalized input vector to thereby generate an equalized input vector in the selected modulation frequency.

11. The wireless device of claim 10, wherein the gain error correction circuit comprises:
an equalizer circuit configured to apply the complex filter to the frequency-equalized input vector to superimpose the respective linearized gain error in the selected modulation frequency onto the respective linearized gain error in the reference modulation frequency;
a vector-to-real (V2R) converter configured to extract a real parameter from the superimposed frequency-equalized input vector, wherein the real parameter indicates an amount of shift that is required to superimpose the respective linearized gain error in the selected modulation frequency onto the respective linearized gain error in the reference modulation frequency;
a scaler configured to scale the real parameter based on a scaling factor to thereby generate a scaled real parameter;
a lookup table (LUT) circuit configured to determine a decibel gain error correction term in the reference modulation frequency based on the scaled real parameter;
a converter circuit configured to convert the decibel gain error correction term into the linearized gain error correction term; and
a multiplier circuit configured to multiply the linearized gain error correction term with the frequency-equalized input vector to thereby generate the equalized input vector.

12. The wireless device of claim 10, wherein the transceiver circuit further comprises a digital baseband circuit configured to generate the input vector in the selected modulation frequency.

13. The wireless device of claim 10, wherein the transceiver circuit further comprises a modulation circuit configured to convert the equalized input vector into a radio frequency (RF) signal and modulate the RF signal onto one of an intermediate frequency and a carrier frequency.

14. The wireless device of claim 10, wherein the transceiver circuit further comprises a memory digital predistortion (mDPD) circuit configured to correct a residual gain error in the equalized input vector.

15. The wireless device of claim 10, wherein the transceiver circuit further comprises a delay circuit configured to delay the frequency-equalized input vector to compensate for a group delay associated with the gain error correction circuit.

16. The wireless device of claim 10, wherein the transceiver circuit further comprises:
a digital baseband circuit configured to generate the input vector in the selected modulation frequency;
a modulation circuit configured to convert the equalized input vector into a radio frequency (RF) signal and modulate the RF signal onto one of an intermediate frequency and a carrier frequency;
a memory digital predistortion (mDPD) circuit configured to correct a residual gain error in the equalized input vector; and
a delay circuit configured to delay the frequency-equalized input vector to compensate for a group delay associated with the gain error correction circuit.

17. The wireless device of claim 16, wherein the transceiver circuit further comprises:
an envelope detection circuit configured to detect a time-variant amplitude envelope of the input vector; and
a target voltage circuit configured to generate a time-variant target voltage envelope that keeps track of the time-variant amplitude envelope of the input vector.

18. The wireless device of claim 17, further comprising:
a power management integrated circuit (PMIC) configured to generate a modulated voltage having a time-variant modulated voltage envelope that tracks the time-variant target voltage envelope; and
a power amplifier circuit configured to amplify the RF signal based on the modulated voltage.

19. The wireless device of claim 10, wherein the reference modulation frequency is a center modulation frequency among the plurality of modulation frequencies.

20. A method for correcting an amplitude error in a wireless device comprising:

applying a frequency equalization filter to an input vector to linearize a gain error of the input vector in each of a plurality of modulation frequencies to thereby generate a frequency-equalized input vector;

applying a complex filter to the frequency-equalized input vector to superimpose a respective linearized gain error in a selected modulation frequency among the plurality of modulation frequencies onto a respective linearized gain error in a reference modulation frequency among the plurality of modulation frequencies;

determining a linearized gain error correction term in the selected modulation frequency based on the respective linearized gain error in the reference modulation frequency; and applying the determined linearized gain error correction term to the frequency-equalized input vector to thereby generate an equalized input vector in the selected modulation frequency.

* * * * *